United States Patent
Lam

(10) Patent No.: US 8,762,433 B1
(45) Date of Patent: Jun. 24, 2014

(54) INTEGRATION ARCHITECTURE FOR SOFTWARE AND HARDWARE DEVELOPMENT

(75) Inventor: Than N. Lam, Riverside, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 361 days.

(21) Appl. No.: 12/906,292

(22) Filed: Oct. 18, 2010

(51) Int. Cl.
- *G06F 7/00* (2006.01)
- *G06F 17/00* (2006.01)
- *G06F 12/00* (2006.01)
- *G06F 17/30* (2006.01)

(52) U.S. Cl.
CPC ...... *G06F 17/3023* (2013.01); *G06F 17/30174* (2013.01); *G06F 17/30194* (2013.01)
USPC .......................................... 707/825; 707/638

(58) Field of Classification Search
CPC .......... G06F 17/3023; G06F 17/30174; G06F 17/30194
USPC .................................. 707/638, 825
See application file for complete search history.

(56) References Cited

U.S. PATENT DOCUMENTS

| | | | |
|---|---|---|---|
| 6,954,766 B2 * | 10/2005 | Ouchi | 1/1 |
| 7,499,899 B2 | 3/2009 | Siegel et al. | |
| 7,603,653 B2 | 10/2009 | Sundararajan et al. | |
| 7,603,656 B2 | 10/2009 | Kuo et al. | |
| 2002/0116702 A1 * | 8/2002 | Aptus et al. | 717/170 |
| 2002/0143726 A1 * | 10/2002 | Planalp et al. | 707/1 |
| 2004/0025173 A1 * | 2/2004 | Levonai et al. | 719/328 |
| 2007/0038660 A1 * | 2/2007 | Nakayama et al. | 707/101 |
| 2007/0043790 A1 * | 2/2007 | Kryger | 707/204 |
| 2007/0083570 A1 * | 4/2007 | Fineberg | 707/203 |
| 2007/0186070 A1 * | 8/2007 | Federa et al. | 711/163 |
| 2007/0240154 A1 * | 10/2007 | Gerzymisch et al. | 717/174 |
| 2008/0040385 A1 * | 2/2008 | Barrall et al. | 707/103 Y |
| 2008/0189718 A1 * | 8/2008 | Gulley et al. | 718/107 |
| 2008/0244534 A1 * | 10/2008 | Golender et al. | 717/128 |
| 2010/0088524 A1 * | 4/2010 | Ford et al. | 713/189 |
| 2010/0333073 A1 * | 12/2010 | Mills | 717/131 |

* cited by examiner

*Primary Examiner* — Apu Mofiz
*Assistant Examiner* — Jared Bibbee
(74) *Attorney, Agent, or Firm* — Howard IP Law Group, PC

(57) ABSTRACT

A workflow integration architecture for improving the coordination of software, hardware, and firmware developments leading to shorter product development schedules and thus reduced cost is presented. The workflow integration architecture has a product structure module that includes a hardware design application component, a software design application component, a firmware design application component, a product requirements component, and a design documents component. The architecture further includes a revision control repository database for permanently storing development tree or subtree including file system objects such as directories, files, symbolic links and hardware links, an external repository database for storing files, path-to-file information, and URL link information relating to product design related documents at a remote location connected to the product structure module via a communications network, a requirements system database for storing product requirements data, an external documents file database for storing technical documents, and a plurality of connector components for linking the components of the product structure module to the databases, whereby any change to one of the databases are propagated to the other databases.

14 Claims, 4 Drawing Sheets

INTEGRATION ARCHITECTURE FOR SOFTWARE AND HARDWARE DEVELOPMENT

CROSS-REFERENCE TO RELATED APPLICATION

None

FIELD OF THE INVENTION

This disclosure generally relates to software, and more particularly to a software integration architecture.

BACKGROUND

In the development of complex products or systems that involve development of software, hardware and firmware, each being developed by separate development engineering groups, the data related to the software, hardware and firmware often reside in different computer and/or software systems and environments that were not designed to support information exchange among the different systems. Because of the lack of integration of the data relating to the software, hardware and firmware being developed, hardware development configuration management, software development configuration management, firmware development configuration management and product requirements are separately generated and manually coordinated. This leads to program delays and additional costs because when inevitable changes occur in the hardware, software, firmware or requirements definition process, the impacts of the changes are often manually managed in separate environments. This disparate management of the development data results in situations where artifacts such as product structures, SysML(Systems Modeling Language) and UML (Unifies Modeling Language) models and code do not contain requirements and links among each other for product requirements and artifacts traceability, configuration management (CM) and lifetime support. Thus, there is a need for a software architecture that can integrate the data exchange among the various software, hardware and firmware development environments.

SUMMARY

According to an embodiment of the present disclosure, a workflow integration architecture is presented. The architecture comprises a product structure module which comprises a hardware design application component; a software design application component; a firmware design application component; a product requirements component; and a design documents component. The architecture further comprises a revision control repository database for permanently storing development tree or subtree including file system objects such as directories, files, symbolic links and hardware links, wherein the first repository database stores current revisions and previous versions of the file system objects; an external repository database for storing files, path-to-file information, and URL link information relating to product design related documents at a remote location connected to the product structure module via a communications network, wherein the external repository database stores current revisions and previous versions of the product design related documents; a requirements system database for storing product requirements data, wherein the requirements system database stores current revisions and previous versions of the product requirements data; an external documents file database for storing technical documents; and a plurality of connector components for linking the components of the product structure module to the databases, whereby any change to one of the databases are propagated to the other databases.

In one implementation of the embodiment of the present disclosure, the software integration architecture of the present disclosure significantly improves the coordination of software, hardware, and firmware developments, and leads to shorter product development schedules and thus reduced cost. This disclosure presents the integration details of the software integration architecture applied to an example case of integrating a product lifecycle management (PLM) software, Windchill product structure application, and will highlight the implementation of the Windchill's capability and linkages to various repository databases such as Dynamic Object Oriented Requirements System (DOORS®), ClearCase® Versioned Object Base (VOB) via ClearCase® Adapter and RMLink® with a focus on the key benefits of the software integration architecture and Windchill product structures on supporting the coordination of system and software engineering processes and program control activities of project managers.

The architecture of the present disclosure provides a set of development tools gathered from COTS (commercial off-the-shelf) products that are integrated together to make every step of the engineering process a seamless transition for developers. The integration tool set supports integration of data from requirements management to analysis and testing of the products.

BRIEF DESCRIPTION OF THE DRAWINGS

These and other features and advantages of the present invention will be more fully disclosed in the following detailed description of a preferred embodiment of the invention, which is to be considered together with the accompanying drawings.

All drawings are schematic and are not intended to show any dimensions to scale.

DETAILED DESCRIPTION

This description of the preferred embodiments is intended to be read in connection with the accompanying drawings, which are to be considered part of the entire written description of this invention.

Figure 1:
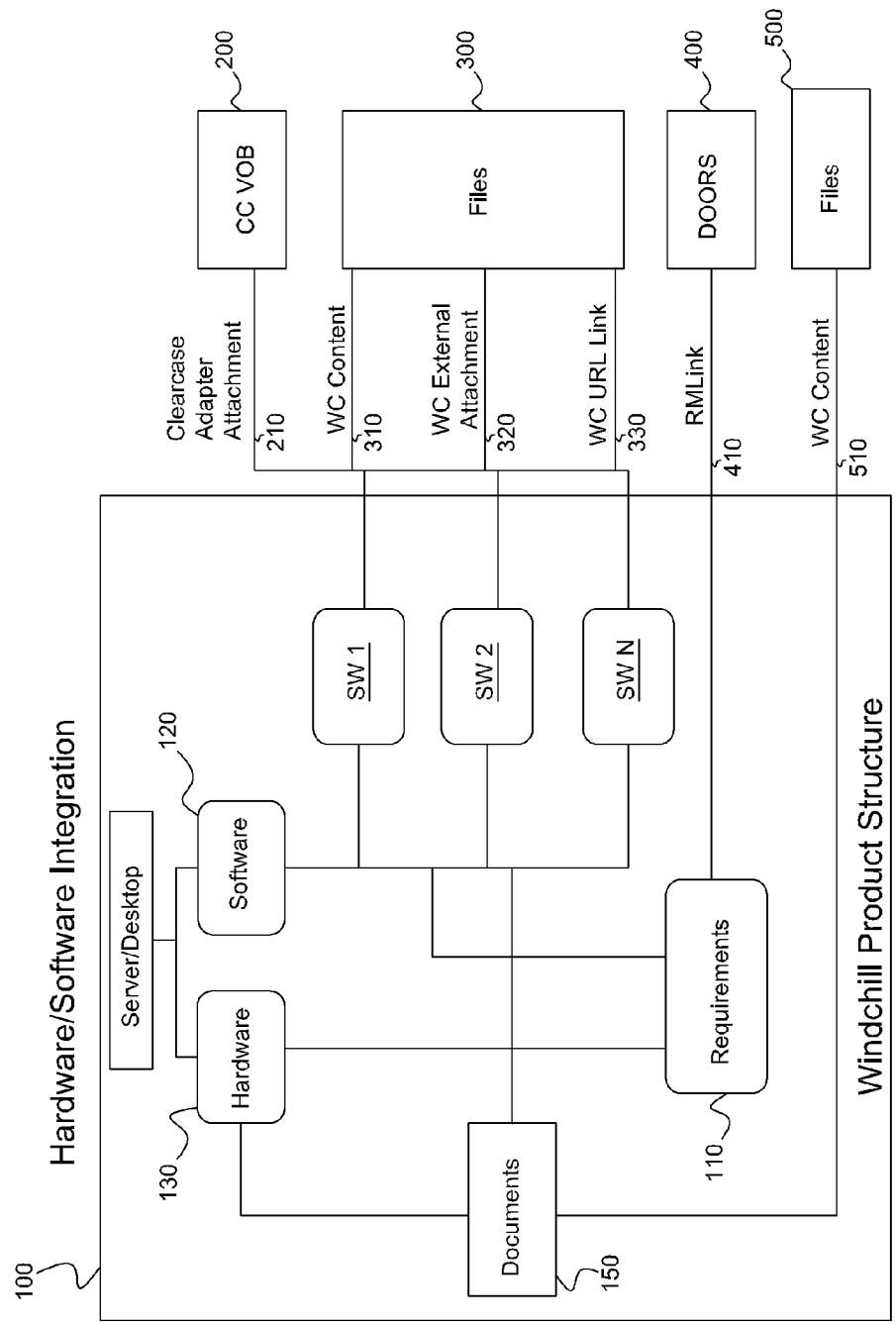
FIG. 1 shows a schematic diagram of the integration architecture according to an embodiment of the present disclosure illustrating the integration of the hardware and software components of the product structure with design data repository databases.

FIG. 1 shows a graphical representation of a computer system integration architecture for integrating hardware and software components of the computer system. A product structure module 100 and its product structure components are linked to the various corresponding design file databases by integration connectors 210, 310, 410, 510. For example, according to a preferred embodiment, a revision control repository database 200 is linked through a first integration connector component 210 to the software objects $SW_1 \ldots SW_n$ of the software component 120 in a product structure module 100 of a computer system. The revision control repository database 200 maintains the current revision of every file as well as previous versions of the files. The software objects $SW_1 \ldots SW_n$ are any entities that can be manipulated by the commands of a programming language, such as a value, variable, function, or data structure. The revision control repository database 200 contains SysML and UML models, and their software in the flat file format and keeps track of changes to the models and software and controls the versions for the changes.

In the illustrated example of the product structure module 100, the revision control software tool is IBM Rational ClearCase® and the revision control repository database 200 is the IBM Rational ClearCase® VOB (versioned object base). The revision control software tool provides revision control of source code, models, and other software development assets. Revision control tools are run on a number of system platforms such as Linux, Solaris and Windows®. The revision control repository database 200 is the permanent data repository for a development tree or subtree. The revision control repository database 200 stores file system objects: directories, files, symbolic links, and hardware links. It also stores non-file-system information such as meta-data. In an embodiment where the ClearCase® VOB is used as the revision control repository database 200, the ClearCase® Adapter would be the connector component 210. An example of the product structure module 100 is the Windchill sever/desktop product structure application, a product lifecycle management application from Parametric Technology Corporation of Needham, Mass.

An external repository database 300 can be linked through a set of three integration connector components 310, 320, 330 to the software objects SW1 . . . SWn of the software component 120. The external repository database 300 provides connections to external data sources through the Internet and the software objects SW1 . . . SWn are user interfaces providing link to the information stored in the databases 200 and 300. An example is a URL link provided to allow the user the direct access to a file or database stored in an external location via the Internet. The three connector components for storing documents 310, 320, 330 to the software objects SW1 . . . SWn. The first of the one or more connector components Windchill Content 310 is for storing documents such as PowerPoint, Word, and PDF files in the product structure. The second of the plurality of connector components Windchill Content External Attachment 320 is for storing path to file information in some folder structure or folder such as externally stored attachment. The third of the plurality of connector components Windchill Content URL Link 330 is for storing information on URL links to locations of software on the Internet, such as a publisher's website.

Additional product structure components connect to files in various locations via the connector components 210, 310, 410, 510. Another product structure component provided in the product structure module 100 is a requirements component 110. The requirements component 110 is a requirements development, definition and management software tool, such as Telelogic's DOORS®. The requirements component 110 helps to increase the quality of systems engineering, business-critical IT and software development projects by improving requirements communication and collaboration. Requirements component 110 within the product structure module 100 is linked to a requirements system database 400 (e.g. DOORS®) through a requirements connector component 410, and is attached to both the software 120 and hardware 130 components in the product structures module 100. The requirements system database 400 contains requirements in text and objects (not in flat files as in the case of the repository database 200). The requirements system database 400 keeps track of the changes and traceability of related requirements and objects. In the case where the requirements system data base 400 is the DOORS® database, the requirements connector component 410 is the RMLink® connector.

Technical documents 150 (e.g. Drawings, Specifications, Manuals, etc) that support the software 120 and hardware 130 components in the product structures module 100 are stored in an external files database 500. The technical documents 150 can be any type of computer files and each can be written in different formats and language depending upon the particular application that created them (e.g. Word, Excel, PDF, text file, etc.). The transmission of these technical documents 150 between the product structure module 100 and the external files database 500 is enabled through an external file connector component 510 that is configured to handle the various data formats and file types. The external files database 500 can contain any type of computer file (e.g. Word, Excel, PDF, text file, etc). Where the product structure module 100 is the Windchill server/desktop product structure application, the external file connector component 510 can be the Windchill Content link. The Windchill server/desktop product structure application 100 establishes a baseline for this product structure by storing the initial design files associated with each of the product structure components in the product structures module 100 into the corresponding design file databases, and then provides configuration and change management as the product design progresses from conceptual to the end of the product's lifecycle management.

Figure 2:
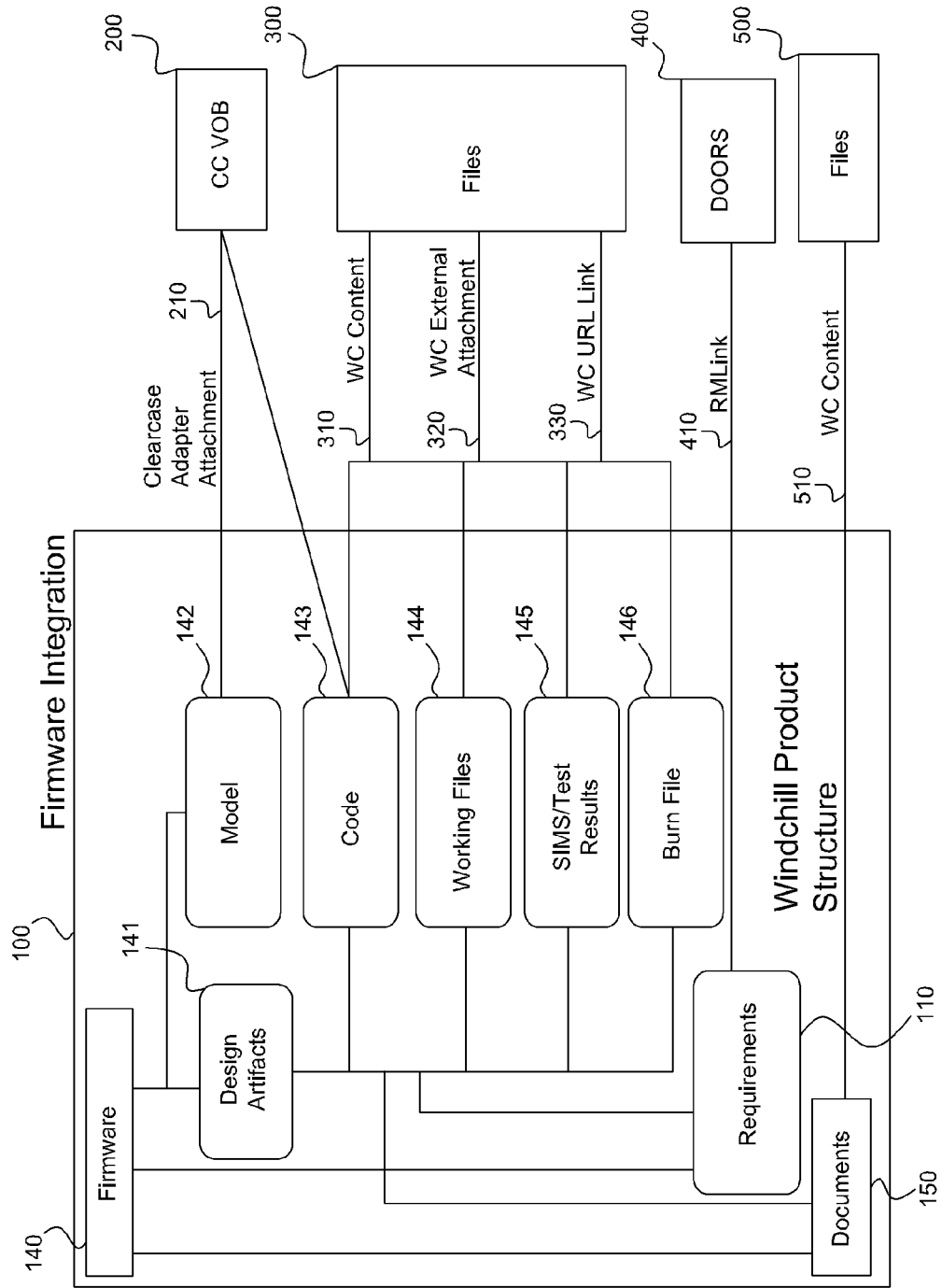
FIG. 2 shows a schematic diagram of the integration architecture according to an embodiment of the present disclosure illustrating the integration of the firmware component of the product structure with design data repository databases.

FIG. 2 shows the architecture for integration of various disparate firmware design files into the product structure module 100. Connections are supported by the connector components 210, 310, 410, 510. Requirements component 110 is extracted from the requirements system database 400, linked to the product structure module 100 through the requirements connector component 410, RMLink, and linked to the appropriate objects in the product structure. External document files in the external repository database 300 are accessed through the Windchill Content connector component 310, the Windchill Content link, and attached to the appropriate product structure components in the product structure module 100. The Windchill application will establish a baseline for this product structure, and then provide configuration and change management as the design progresses from conceptual to retirement.

For supporting the firmware integration, the product structure module 100 includes a Design Artifacts component 141 that include all files, properties, analyses, design information and test required by the design; a Model component 142 that includes architecture framework, SysML, and UML models; a Code component 143 that includes properties and files representing a computer program's source code. The Code component 143 is a collection of files needed to convert from human-readable form to some computer-executable form. The product structure module also includes Working Files component 144 that includes properties and files representing configuration files, library, settings, and additional files required to generate Code or generate executables; Test Results component 145 that include properties and files representing results of tests runs and simulations used to verify functionality and requirements and Burn File component 146 that include properties and files representing of software files or executable used to embed firmware code (i.e. burn) onto programmable device.

The product structure is a hierarchical decomposition of a product, typically known as the bill of materials ("BOM"). As business becomes more responsive to unique consumer tastes and derivative products grow to meet the unique configurations, BOM management can become unmanageable. In FIG. 2 the Product Structure illustrates the structure of a firmware. The core of the product structure is illustrated by the product components (items requirements component 110, technical documents 150, Design Artifacts 141, Model 142, Code 143, Working Files 144, Test Results 145, and Burn File 146) and their relationships. Thus, this involves the linking between items 110, 150, 141, 142, 143, 144, 145, and 146 related to the Firmware 140.

Figure 3:
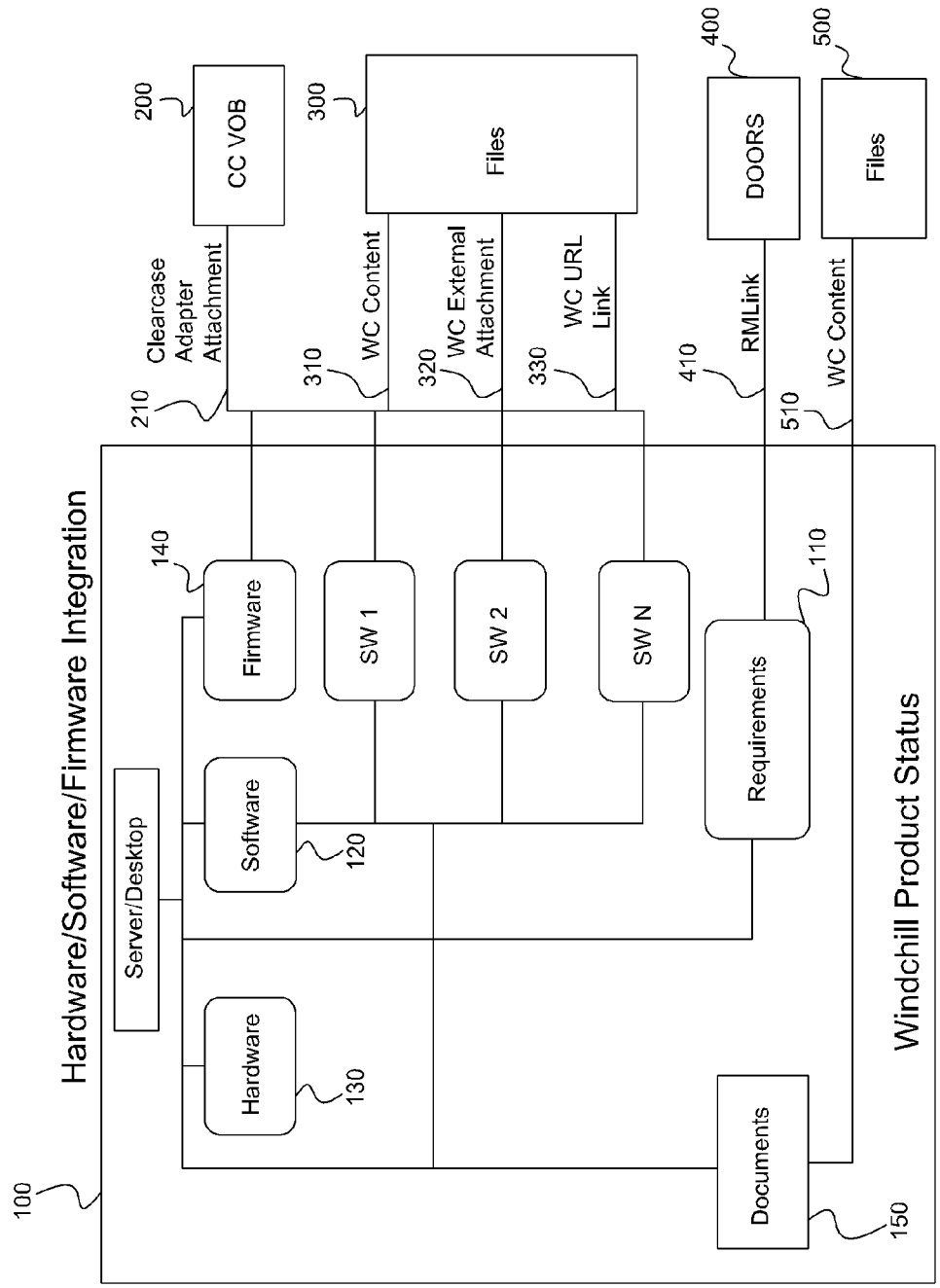
FIG. 3 shows a schematic diagram of the integration architecture of the present disclosure integrating the hardware, software and firmware for the product structure linked and integrated to the various design data repository databases.

FIG. 3 shows that after the initial designs for the hardware component 130, software component 120 and firmware component 140 for the product structure are completed, the overall design can be managed by the product structure module 100. The software component 120 includes properties about a generic piece of code used on the hardware component 130. The hardware component 130 includes properties about a generic piece of electronic device. The firmware component 140 includes properties about a generic fixed (usually small) programs and data structure that control electronic devices.

The product structure module 100 is a hierarchical decomposition of a server/desktop. In system design, hierarchical decomposition refers to dividing the system into top-level subsystems which in turn are divided into second-level subsystems and so on. The core of the server/desktop is illustrated by the product components (the requirements component 110, the technical documents component 150, the hardware component 130, the software component 120, and the firmware component 140) and their relationships. Thus, this involves the linking between items 110, 150, 130, 120, and 140 related to the server/desktop.

As described above, the repository databases 200, 300, the requirements system database 400 and the external document files database 500 are configures for storing different types of data. Because of this reason, these databases may only be known to and/or utilized by different group of users of the product structure module 100. For example, the product requirements engineers may only work with data in the requirements system database 400 and may not have knowledge about the other databases 200, 300, and 500. The systems and software engineers may only work with data in the revision control repository database 200 and may not have knowledge about the other databases 300, 400, and 500. The hardware engineers, in turn, may only work with data in the external repository database 300 and the technical documents stored in the external document files database 500 and product structure may not have knowledge about the other databases 200 and 400.

The databases 200, 300, 400, and 500 are stored in different environments in order to accommodate the fact that these databases are based on different technologies and stores different data types. For example, one can retrieve some data from the Internet but should not place his/her designed data in the Internet. Or legal data should not be place in the financial database.

Also, the databases 200, 300, 400 and 500 may or may not meet the typical definition of a database and my not follow any architectural database definition. In the illustrated example, the revision control repository database 200 and the requirements system database 400 meet the technical definition of a database. However, the external repository database 300 and the external document files database 500 do not.

The impacts of changes in software artifacts, requirements, documentation, and hardware can be rapidly and efficiently evaluated and updates are incorporated into the product design using this product lifecycle management application implementation. Throughout the system development life cycle including the system and software engineering processes and program control activities of a product, each time a requirement is changed or a new requirement is added, impacts of changes can be traced to hardware, software, and firmware. The product and program stakeholders including customer, subcontractor, program and project manager, engineer, and user see how a change impacts their program and project's schedule, resource, and quality enabling the stakeholders significantly improve the coordination of software, hardware, and firmware developments, and lead to shorter development schedules and reduced costs.

When a piece of design data is changed in one design data environment, the changes are updated into the corresponding database and then disseminated or propagated to other appropriate databases by the product structure module 100 which is based on the Windchill application. The "requirements" is changed when a change to hardware, software, firmware designs need to be changed. This establishes a new requirements data. This is accomplished by the configuration of the connections between the Windchill based product structure module 100 and the databases 200, 300, 400 and 500. The configuration of the connections between the product structure module 100 and the various databases are what enable the changes to be propagated to the appropriate databases.

Figure 4:
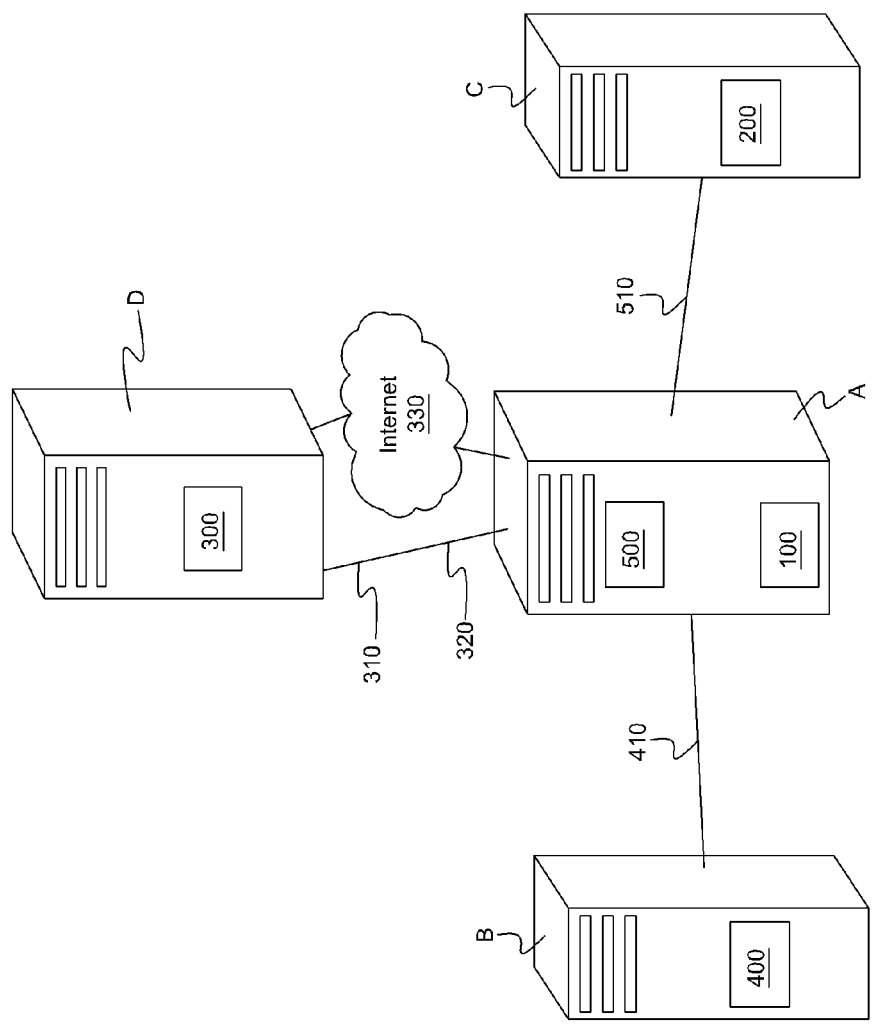
FIG. 4 is a schematic diagram of a system implementing the workflow integration architecture of the present disclosure.

FIG. 4 is an example of a network of computer systems showing where each of the software applications and tools described herein can reside in the network. The network system consists of the product structures module 100 (e.g. Windchill Server Application) and its associated external document files database 500, residing in a server computer A. The requirements system database 400 (e.g. DOORS®) resides in a server computer B, and the revision control repository database 200 resides in a server computer C. The external repository database 300 resides on one or more server computers D. The server computer D is conceptually illustrated with a single server computer figure but in actual implementation can comprise one or more server computers that are accessible to the server computer A by any local or remote network connections or through the Internet. The corresponding integration connector components 210, 310, 320, 330, 410 and 510 provide the data link between the product structures module 100 and the various databases 200, 300, 400 and 500 described herein.

The invention claimed is:

1. An integration architecture for product data management, the integration architecture comprising:
   a processor in communication with a memory, the memory storing machine-readable instructions that when executed by the processor cause the processor to:
   establish a requirements component that manages and traces changes in requirements data and link the requirements component to a requirements system database;
   establish a software component that tracks software properties via a revision control repository database;
   establish a hardware component that tracks properties of at least one piece of an electronic device;
   establish a firmware component that tracks properties of a piece of firmware for controlling operation of the at least one piece of electronic device;

establish a technical documents component that transmits technical documents between the technical documents component and an external documents database, wherein the stored technical documents support the software, hardware and firmware components;

create a baseline model based on the software component, the hardware component, the firmware component, the technical documents component and the requirements component and store the baseline model in the requirements system database; and establish connections between said requirement components, said software component, said hardware component and said firmware component wherein a change in any one of the software, hardware or firmware components creates a change in requirements data stored in the requirements system database and managed by said requirements component and wherein said requirements component updates a property in at least one other component of the integration architecture.

2. The integration architecture of claim 1, wherein said firmware component further comprises:

a plurality of connector components configured to connect said firmware component to an external requirements system database, an external repository database and the revision control repository database;

a design artifacts component that manages files, properties, analyses, design and test data for a project design;

a model component that manages an architecture framework and software based models;

a code component that manages a collection of files to convert software files from a human readable form to a computer executable form;

a working files component that manages properties and files including configuration files, libraries, settings and files needed to generate executable files; and a burn component for managing properties and files for executable files used to embed firmware code onto a programmable device.

3. The integration architecture of claim 2, wherein said model component is configured to manage SysML or UML models.

4. The integration architecture of claim 3, wherein said SysML or UML models are stored in the revision control repository database.

5. The integration architecture of claim 1, further comprising:

a first connection component in communication between the software component and the revision control repository database;

a second connection component in communication between the hardware component and an external repository database storing documents, path to file information, and Uniform Resource Locator (URL) links to external locations of software;

a third connection component in communication between the requirements component and an external requirements system database; and a fourth connection component in communication between the documents component and the external documents database.

6. The integration architecture of claim 5, wherein said second connection component is configured to communicate document files between the hardware component and the external repository database and further comprising:

a fifth connection component in communication between the hardware component and the external repository database configured to communication file to path information between the hardware component and the external repository database; and a sixth connection component in communication between the hardware component and the external repository database configured to communication URL links between the hardware component and the external repository database.

7. The integration architecture of claim 5, wherein said requirements component is configured to receive a notification of a change in a requirement from one of the revision control repository database, the external repository database and the documents database, and communicate the requirements change to the requirements system database and propagate the requirements change to at least one of the revision control repository database, the external repository database and the documents database.

8. A computer implemented method of integrating a product data management system, the method comprising:

in a processor processing machine executable instructions, the instructions causing the processor to perform the steps of:

defining a requirements component that manages and traces changes in requirements data and linking the requirements component to a requirements system database;

defining a software component that tracks software properties via a revision control repository database;

defining a hardware component that tracks properties of at least one piece of an electronic device;

defining a firmware component that tracks properties of a piece of firmware for controlling operation of the at least one piece of electronic device;

defining a technical documents component configured to transmit technical documents between the technical document component and an external documents database, wherein the stored technical documents support the software, hardware and firmware components; and defining connections between said requirement components and said software component, said hardware component and said firmware component wherein a change in any one of the software, hardware or firmware components creates a change in a requirement data managed by said requirements component and wherein said requirements component updates a property in at least one other component of the product data management system.

9. The method of claim 8, further comprising the processor performing the steps of:

defining a plurality of connector components configured to connect said firmware component to an external requirements system database, an external repository database and the revision control repository database;

defining a design artifacts component that manages files, properties, analyses, design and test data for a project design;

defining a model component that manages an architecture framework and software based models;

defining a code component that manages a collection of files to convert software files from a human readable form to a computer executable form;

defining a working files component that manages properties and files including configuration files, libraries, settings and files needed to generate executable files; and defining a burn component for managing properties and files for executable files used to embed firmware code onto a programmable device.

10. The method of claim 9, wherein said model component is configured to manage SysML and UML models.

11. The method of claim 10, wherein said SysML and UML models are stored in the revision control repository database.

12. The method of claim 8, further comprising:
defining a first connection component in communication between the software component and the revision control repository database;
defining a second connection component in communication between the hardware component and an external repository database storing documents, path to file information, and Uniform Resource Locator (URL) links to external locations of software;
defining a third connection component in communication between the requirements component and an external requirements system database; and
defining a fourth connection component in communication between the documents component and the external documents database.

13. The method of claim 12, wherein said second connection component is configured to communicate document files between the hardware component and the external repository database and further comprising the processor performing the steps of:
defining a fifth connection component in communication between the hardware component and the external repository database configured to communication file to path information between the hardware component and the external repository database; and
defining a sixth connection component in communication between the hardware component and the external repository database configured to communication URL links between the hardware component and the external repository database.

14. The method of claim 12, wherein said processor causes requirements component to receive a notification of a change in a requirement from one of the revision control repository database, the external repository database and the documents database, and communicate the requirements change to the requirements system database and propagate the requirements change to at least one of the revision control repository database, the external repository database and the documents database.

* * * * *

UNITED STATES PATENT AND TRADEMARK OFFICE
CERTIFICATE OF CORRECTION

PATENT NO.         : 8,762,433 B1
APPLICATION NO.    : 12/906292
DATED              : June 24, 2014
INVENTOR(S)        : Than M. Lam It is certified that error appears in the above-identified patent and that said Letters Patent is hereby corrected as shown below:

In the Claims

Column 7, claim 1, lines 12 and 13, and Column 8, claim 8, lines 42 and 43, after the word "said", the claim term "requirement components" should read "requirements component".

Signed and Sealed this
Twenty-third Day of September, 2014

Michelle K. Lee
*Deputy Director of the United States Patent and Trademark Office*